US006748206B1

(12) United States Patent
Matsumoto

(10) Patent No.: US 6,748,206 B1
(45) Date of Patent: Jun. 8, 2004

(54) LOW-POWER-CONSUMPTION RADIO RECEIVER

(75) Inventor: Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/337,849

(22) Filed: Jun. 21, 1999

(30) Foreign Application Priority Data

Jun. 23, 1998 (JP) .......................................... 10-175236

(51) Int. Cl.[7] .................................................. H04B 1/26
(52) U.S. Cl. ......................... 455/334; 455/39; 370/225; 370/275; 370/316
(58) Field of Search ................................ 455/334, 136, 455/197, 208, 209, 13.4, 20, 21, 22, 38.3, 70, 71, 72, 575, 323, 302, 500, 73, 78; 375/225, 275, 316; 370/230, 232, 233, 234, 235

(56) References Cited

U.S. PATENT DOCUMENTS 4,005,423 A * 1/1977 Webb ........................ 343/17.2
4,143,418 A * 3/1979 Hodge et al. ............... 364/200
4,740,963 A * 4/1988 Eckley ....................... 370/522
4,754,450 A * 6/1988 Lynk, Jr. et al. .............. 370/29
5,278,837 A 1/1994 Kelley
5,404,375 A * 4/1995 Kroeger et al. ............. 375/142
5,557,642 A 9/1996 Williams
5,568,142 A * 10/1996 Velazquez et al. .......... 341/126
5,583,884 A * 12/1996 Maruyama et al. ......... 375/207
5,621,730 A 4/1997 Kelley
5,771,226 A * 6/1998 Kaku ......................... 370/232
5,790,538 A * 8/1998 Sugar ......................... 370/352
5,822,318 A * 10/1998 Tiedemann, Jr. et al. ... 370/391
5,872,810 A * 2/1999 Philips et al. ............... 375/130
5,920,840 A * 7/1999 Satyamurti et al. ......... 704/267
5,923,651 A * 7/1999 Struhsaker .................. 370/342
5,982,813 A * 11/1999 Dutta et al. ................. 375/219
6,075,814 A * 6/2000 Yamano et al. ............. 375/222
6,085,073 A * 7/2000 Palermo et al. ............. 455/205
6,088,402 A * 7/2000 White ......................... 375/326
6,091,765 A * 7/2000 Pietzold, III et al. ....... 375/219
6,154,659 A * 11/2000 Jalali et al. ................. 455/522
6,175,599 B1 * 1/2001 Lyon et al. ................. 375/261
6,343,207 B1 * 1/2002 Hessel et al. ............... 455/552
6,424,631 B1 * 7/2002 Czaja et al. ................ 370/252

FOREIGN PATENT DOCUMENTS

| | | |
|---|---|---|
| JP | 03-066244 | 3/1991 |
| JP | 04-286248 | 10/1992 |
| JP | 05-136780 | 6/1993 |
| JP | 05-183450 | 7/1993 |
| JP | 06-021988 | 1/1994 |
| JP | 06-338796 | 12/1994 |
| JP | 7-240088 | 9/1995 |
| WO | 0 632 577 A1 | 1/1995 |

OTHER PUBLICATIONS

Copy of Japanese Office Action dated Jun. 24, 2003 (and English abstract of relevant portion).

* cited by examiner

*Primary Examiner*—Cong Van Tran
(74) *Attorney, Agent, or Firm*—Dickstein, Shaprio, Morin & Oshinsky, LLP.

(57) ABSTRACT

A radio receiver includes a device for decreasing the data rate of reception data in accordance with the channel frequency of the reception data, and a device for performing signal processing for the reception data whose data rate has been decreased.

18 Claims, 5 Drawing Sheets

LOW-POWER-CONSUMPTION RADIO RECEIVER

BACKGROUND OF THE INVENTION

1. Field of the Invention

The present invention relates to a radio receiver and, more particularly, to a low-power-consumption radio receiver which can receive a plurality of different channel frequencies and can reduce power consumption.

2. Description of the Prior Art

Various radio receivers such as portable telephones and mobile computers have been proposed. Recently, a software radio system has been proposed and developed.

This software radio system is characterized in that the same device can perform communications at different frequencies or by different communication schemes by making software changes.

A reduction in power consumption presents a significant challenge to a radio receiver, and more specifically, a portable radio receiver, and demands have arisen for the development of low-power consumption radio receiver.

SUMMARY OF THE INVENTION

The present invention has been made in consideration of the above situation in the prior art, and has as its object to provide a low-power-consumption radio receiver which reduces power consumption by decreasing the data rate of reception data.

In order to achieve the above object, according to the first aspect of the present invention, there is provided a radio receiver comprising a device for decreasing a data rate of reception data in accordance with a channel frequency of the reception data, and a device for performing signal processing for the reception data whose data rate has been decreased.

According to the second aspect of the present invention, there is provided a radio receiver capable of receiving a plurality of different channel frequencies, comprising an A/D converter for A/D-converting a reception signal, a signal processing section for performing digital signal processing for a signal having undergone digital conversion in the A/D converter, and a sampling frequency changing device for changing a sampling frequency in the A/D converter in accordance with a frequency of the reception signal, or a data rate changing device for changing a data rate of the signal input to the signal processing section and having undergone digital conversion.

According to the third aspect of the present invention, there is provided a power consumption reducing method in a radio receiver, comprising the steps of decreasing a data rate of reception data, and performing signal processing for the reception data whose data rate has been decreased.

Power consumption poses a significant challenge to portable telephones, mobile computers, and the like. It is known that power consumption can be reduced in signal processing by decreasing the clock used for the processing. In the present invention, the clock required for signal processing is decreased by decreasing the data rate, thereby realizing a power consumption reducing effect.

The above and many other objects, features and advantages of the present invention will become manifest to those skilled in the art upon making reference to the following detailed description and accompanying drawings in which preferred embodiments incorporating the principle of the present invention are shown by way of illustrative example.

DETAILED DESCRIPTION OF PREFERRED EMBODIMENTS

Several preferred embodiments of the present invention will be described below with reference to the accompanying drawings.

Figure 1:
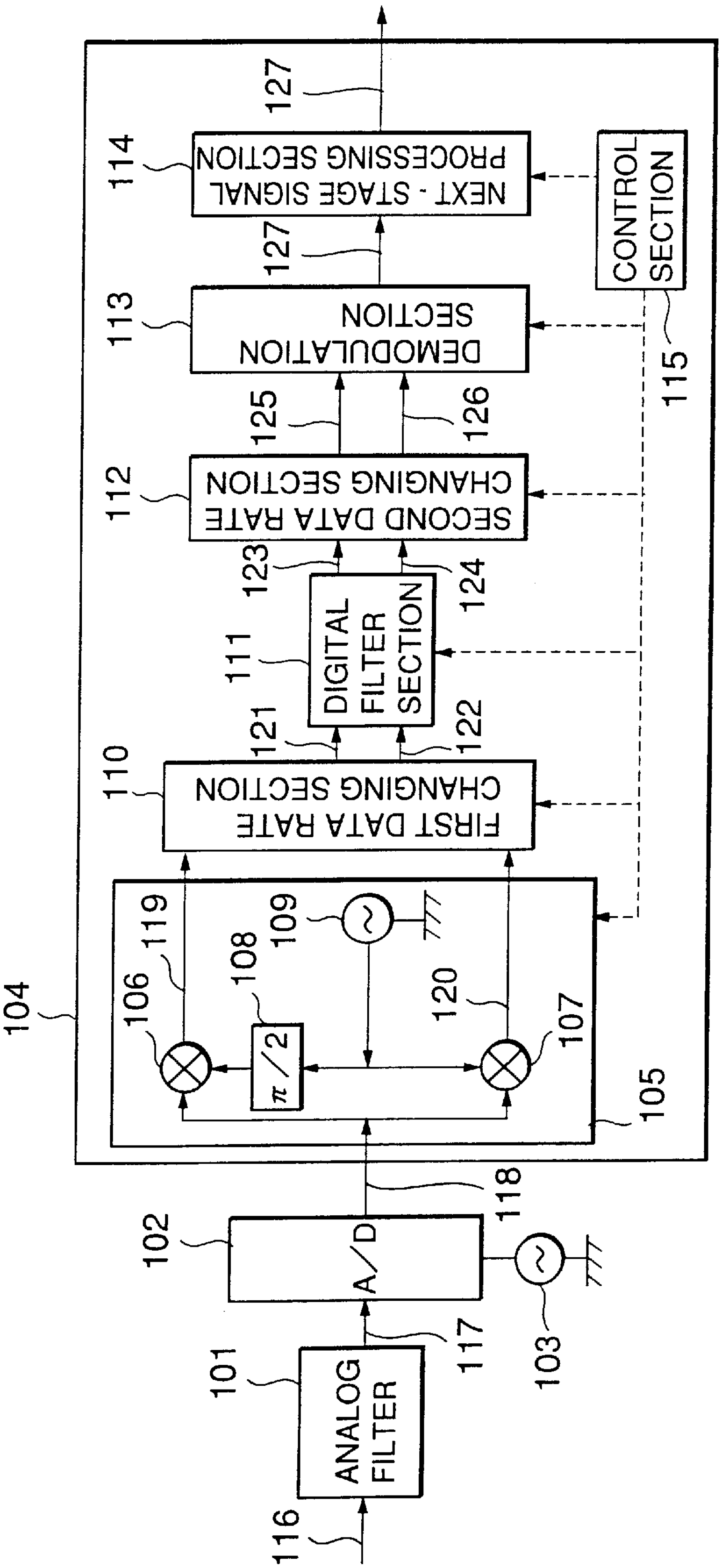
FIG. 1 is a schematic block diagram showing the main part of a radio receiver according to an embodiment of the present invention.

FIG. 1 is a schematic block diagram showing the main part of a radio receiver according to the first embodiment of the present invention.

Referring to FIG. 1, the radio receiver according to the first embodiment includes an analog filter 101 for limiting an input signal band, an A/D converter 102 for sampling an input signal and converting it into a digital signal, an oscillator 103 for supplying a sampling clock to the A/D converter 102, and a signal processing section 104.

The signal processing section 104 is comprised of a DSP or CPU, a ROM, and a RAM. This section may be implemented by software or hardware by using a logic circuit such as a gate array or FPGA.

The signal processing section 104 is comprised of a quadrature demodulation section 105 for quadrature-demodulating digital data 118 received from the A/D converter 102, a first data rate changing section 110 for changing the data rate of I and Q signals after quadrature demodulation, a digital filter section 111 for extracting a channel to be received, a second data rate changing section 112, a demodulation section 113, a next-stage signal processing section 114 for performing conventional signal processing such as decoding, and a control section 115.

The quadrature demodulation section 105 is comprised of mixers 106 and 107, a digital oscillator 109, and a $\pi/2$ shift section 108.

FIGS. 2A to 2G and FIGS. 3A to 3G are timing charts for explaining a variable sampling frequency decreasing method in the first embodiment shown in FIG. 1.

The operation of the first embodiment of the present invention will be described below with reference to FIGS. 2A to 2G or FIGS. 3A to 3G.

Assume that in a radio receiver capable of receiving several different channel frequencies in a receivable frequency band (to be referred to as a receivable band hereinafter) B, a given channel frequency fIFn (n is an arbitrary number) is to be received. The arrangement of part of the reception section in operation to be performed in this case will be described below with reference to FIG. 1.

An analog input signal 116 is band-limited by the analog filter 101. The analog filter 101 is a filter that passes the receivable band B.

A band-limited signal 117 is sampled and quantized by the A/D converter 102 with a sampling clock generated by the oscillator 103 and having a sampling frequency fs. According to the Nyquist theorem, the sampling frequency fs must be two times or more the receivable band B. The data rate of the signal 118 is the sampling frequency fs.

The signal processing section 104 is constituted by a DSP or CPU, a ROM, and a RAM when it has a software configuration. When this section is to have a logic configuration, the same function is implemented by a gate array, FPGA, or the like.

The signal 118 (data rate fs) sampled by the A/D converter 102 is input to the signal processing section 104.

To quadrature-demodulate the received channel frequency fIFn, the control section 115 controls the quadrature demodulation section 105 constituted by the mixers 106 and 107, the digital oscillator 109, and the π/2 shift section 108. More specifically, the control section 115 controls the digital oscillator 109 to set the channel frequency to fIFn.

I and Q signals 119 and 120 after quadrature demodulation are input to the first data rate changing section 110. The first data rate changing section 110 performs data rate changing operation on the basis of the information of the received channel fIFn under the control of the control section 115, thereby setting the data rate of output signals 121 and 122 to fsn (n is an arbitrary number).

Signals 123 and 124 having passed through the digital filter section 111 serving as a channel filter are input to the second data rate changing section 112. The control section 115 controls the second data rate changing section 112 to set output signals 125 and 126 from the second data rate changing section 112 to a data rate fsa0. At this time, the data rate fsa0 must satisfy the Nyquist condition with respect to a pass band B0 required for reception. In this case, since the signals 125 and 126 have been decreased to the baseband, fsa0 is set under the condition that the data rate should be the pass band B0 or more.

These signals 125 and 126 are input to the demodulation section 113 to be demodulated. A demodulated signal 127 is transferred to the next-stage signal processing section 114. The next-stage signal processing section 114 is an existing signal processing section and has constituent elements for control by signal formats, decoding, speech reproduction, and the like. The next-stage signal processing section 114 outputs sound, light, speech, FAX data, LCD data, PC data, and the like.

Alternatively, the data rate change operation described above in connection with the second data rate changing section 112 may be performed in the digital filter section 111.

A variable sampling frequency decreasing method in the embodiment shown in FIG. 1 will be described with reference to FIGS. 2A to 2G.

Figure 2A:
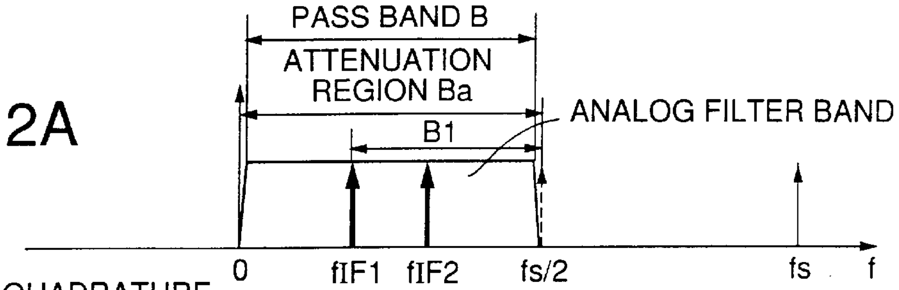
FIGS. 2A to 2G are timing charts for explaining a variable sampling frequency decreasing method in the embodiment shown in FIG. 1.

FIG. 2A shows the characteristics of an analog filter including the receivable band B in its pass band and reception channel frequencies fIF1 and fIF2 in the radio receiver of the present invention.

In addition, reference symbol Ba denotes the attenuation band of the analog filter 101 which is set as a condition for sufficiently cutting off interference by other channels or noise and allows sufficient attenuation at frequencies that differ by a certain value or more. In this case, "sufficient attenuation" indicates a level at which aliasing noise (to be described later) is not superimposed on the necessary reception signal to degrade its sensitivity.

The received channel frequencies are the channel frequencies fIFi and fIF2, and a larger frequency difference between the frequency at which a sufficient attenuation band is obtained and the channel frequency fIF1 is denoted by reference symbol B1. FIG. 2A also shows the sampling frequency fs in A/D conversion in which the frequency must be two times or more the receivable band B according to the Nyquist theorem.

Figure 2B:
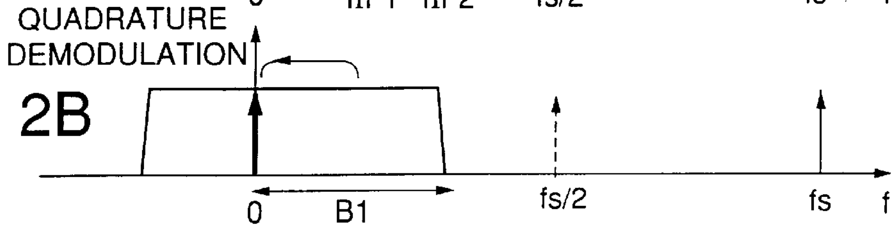

FIG. 2B shows a case in which the reception channel fIF1 is decreased to the baseband in the quadrature demodulation section 105. Since both the I and Q signals 119 and 120 undergo the same frequency change, changes in the frequencies of these signals are not separately shown.

Figure 2C:
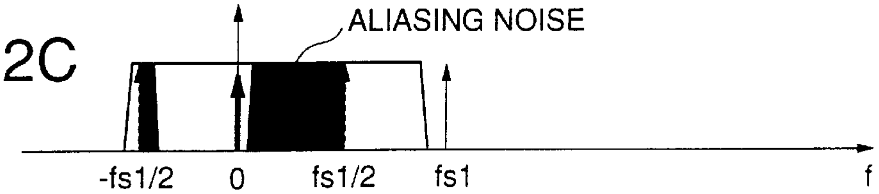

FIG. 2C shows the signals 121 and 122 obtained when the data rate is changed to fs1 by the first data rate changing section 110. Aliasing noise is a general definition. In digital signal processing, a frequency ½ or more the sampling frequency which falls out of the Nyquist definition becomes aliasing noise. Referring to FIG. 2C, fs1 must be set to prevent aliasing noise from entering a pass band B0 required for reception. In this case, since the frequency separation B1 from the attenuation region shown in FIGS. 2A and 2B becomes dominant, fs1 must satisfy the condition given by:

$$fs1 \geq B1 + B0/2 \qquad (1)$$

where B0 is the required pass band.

Figure 2D:

FIG. 2D shows a case in which the required pass band B0 is extracted by the digital filter section 111, and the data rate is changed to fsa0 by the second data rate changing section 112.

Since the signals have already been band-limited by the digital filter section 111, even if the sampling rate is decreased to fsa0 two times or more the pass band B0, aliasing noise exerts no influence on the signals. These signals are the signals 125 and 126, which are sent to the demodulation section 113.

Figure 2E:
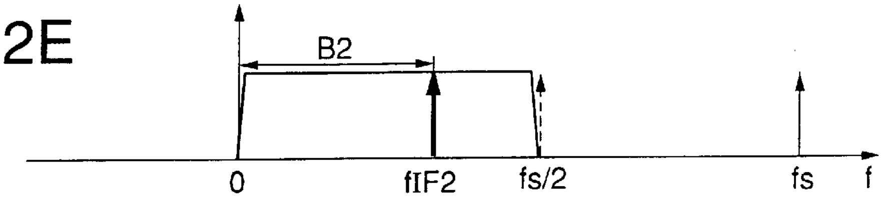

Reception of the channel frequency fIF2 in FIG. 2E will be described next. Assume that a band with a larger frequency separation from the attenuation frequency of the analog filter 101 is represented by B2 as in the case of the reception channel frequency fIF1.

Figure 2F:
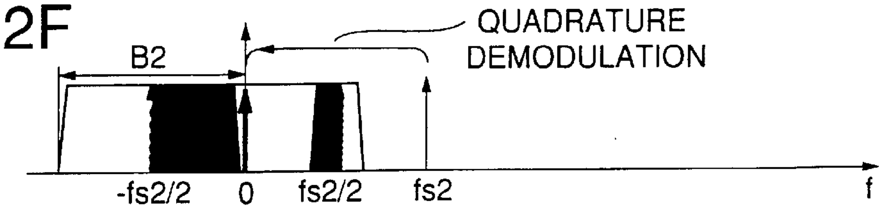

When the frequency is changed to the baseband by quadrature demodulation, and the sampling frequency is decreased to fs2 as shown in FIG. 2F, aliasing noise is produced as shown in FIG. 2F. To prevent this aliasing noise from entering the required frequency band B0 of the reception channel frequency fIF2, the sampling frequency fs2 must satisfy the condition given:

$$fs2 \geqq B2 + B0/2 \quad (2)$$

where B0 is the required pass band.

Figure 2G:
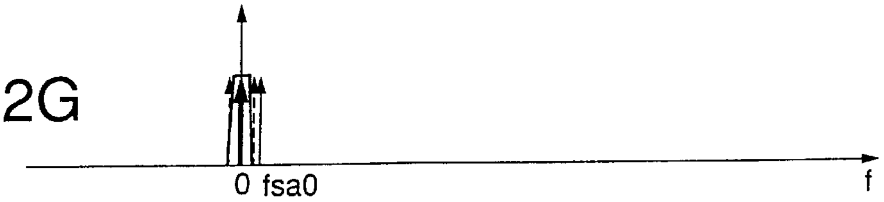

FIG. 2G shows a case in which the pass band B0 is extracted by the digital filter section 111, and the data rate is changed to fsa0 by the second data rate changing section 112.

Since the signals have already been band-limited by the digital filter section 111, even if the sampling rate is decreased to fsa0, aliasing noise exerts no influence on the signals. These signals are signals 125 and 126, which are sent to the demodulation section 113.

As is obvious from these results, the data rates fs1 and fs2 of the data 121 and 122 input to the digital filter section 111 can be effectively decreased on the basis of the respective reception frequencies fIF1 and fIF2.

Another variable sampling frequency decreasing method in the embodiment shown in FIG. 1 will be described with reference to FIGS. 3A to 3G.

Figures 3A, 3B, 3C, 3D, 3E, 3F, 3G:
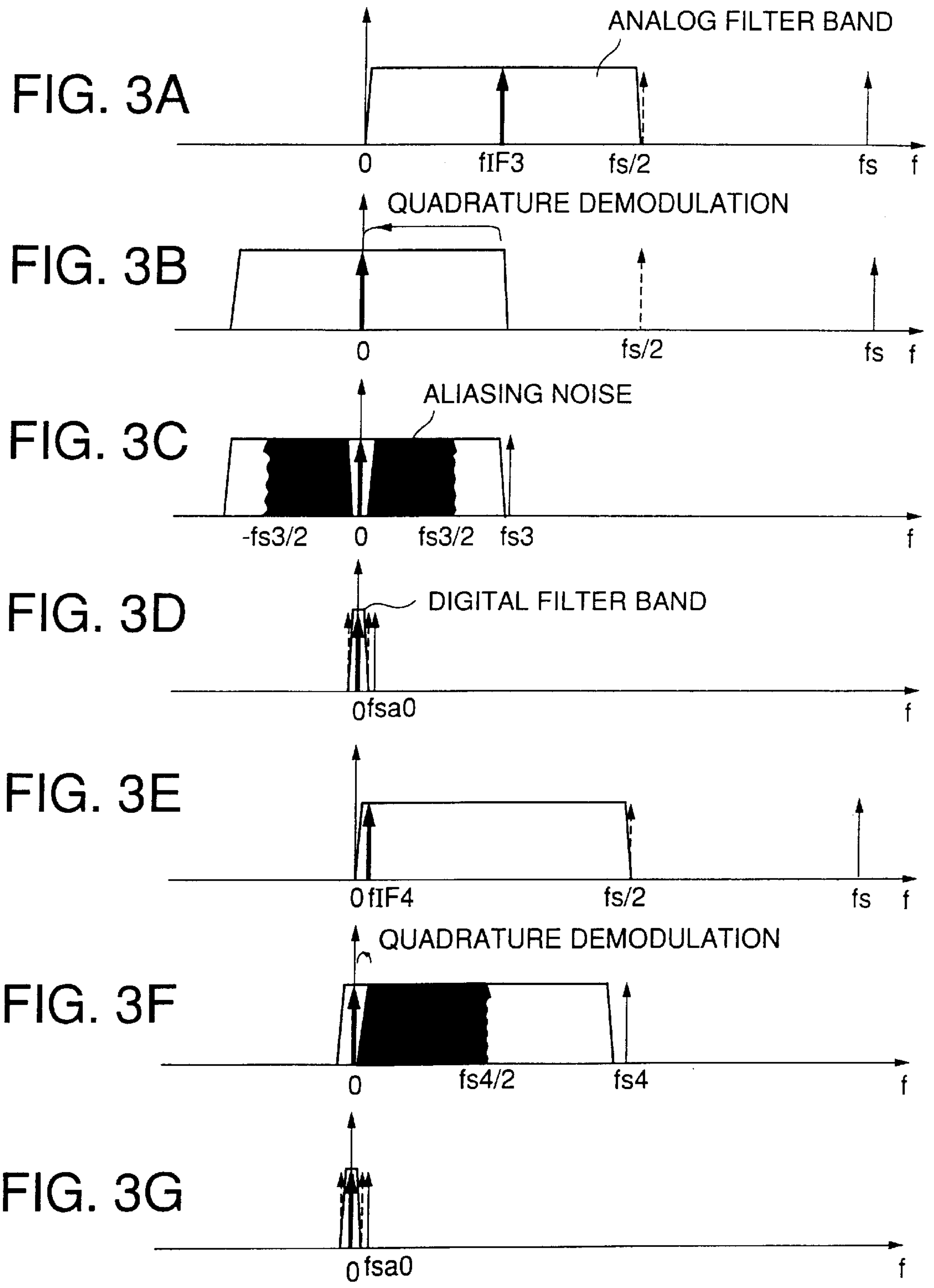
FIGS. 3A to 3G are timing charts for explaining another variable sampling frequency decreasing method in the embodiment shown in FIG. 1.

FIG. 3A shows an analog filter band including the receivable band B and the sampling frequency fs in A/D conversion which is two times or more the receivable band B. In this case, a channel frequency fIF3 to be received is the center of the sufficient attenuation band Ba (≧receivable band B) of the analog filter, whereas a channel frequency fIF4 is the lowest channel at an end of the receivable band B.

FIG. 3B shows the I and Q signals 119 and 120 obtained when the reception channel frequency fIF3 is decreased to the baseband in the quadrature demodulation section 105.

FIG. 3C shows the signals 121 and 122 obtained when the data rate is changed to fs3 in the first data rate changing section 110. That is, in the case shown in FIG. 3C, to set fs3 so as to prevent aliasing noise from entering the required pass band B0, fs3 must satisfy the condition given by:

$$fs3 \geqq (Ba + B0)/2 \quad (3)$$

where Ba is the band with which the analog filter cannot satisfactorily cut off noise, and B0 is the required pass band.

FIG. 3D shows a case in which the required pass band B0 is extracted by the digital filter section 111, and the data rate is changed to fsa0 by the second data rate changing section 112.

Since the signals have already been band-limited by the digital filter section 111, and fsa0 is higher than the pass band B0, even if the sampling rate is decreased to fsa0, no influences are exerted on the signals. These signals are the signals 125 and 126, which are sent to the demodulation section 113.

Reception of a channel frequency fIF4 shown in FIG. 3E will be described next.

FIG. 3F shows the signals 121 and 122 obtained when the reception channel frequency fIF4 is decreased to the baseband in the quadrature demodulation section 105, and the data rate is changed to fs4 in the first data rate changing section 110. As in the case in FIG. 3C, FIG. 3F shows aliasing noise. That is, in the case in FIG. 3F, fs4 is set under the condition given below to prevent aliasing noise from entering the required band B0:

$$fs4 \geqq (Ba + B)/2 \quad (4)$$

where Ba is the band with which the analog filter cannot satisfactorily cut off noise, and B is the receivable band described above.

FIG. 3G shows a case in which a required band is extracted by the digital filter section 111, and the data rate is changed to fsa0 by the second data rate changing section 112.

Since the signals have already been band-limited by the digital filter section 111, even if the sampling rate is decreased to fsa0, no influences are exerted on the signals. These signals are the signals 125 and 126, which are sent to the demodulation section 113.

As is obvious from these results, the sampling frequencies fs3 and fs4 of data input to the digital filter section 111 can be changed on the basis of the different reception channel frequencies fIF3 and fIF3, and the operating frequency of the digital filter can be decreased independently. In this case, the data rates fs3 and fs4 based on the reception channel frequencies fIF3 and fIF4 represent conditions for the minimum and maximum sampling frequencies. In addition, with regard to the condition of the reception channel frequency fIF4 on which the sampling condition is maximized, there is no difference between the lowest channel frequency and the highest channel frequency in the receivable band B.

Figure 4:
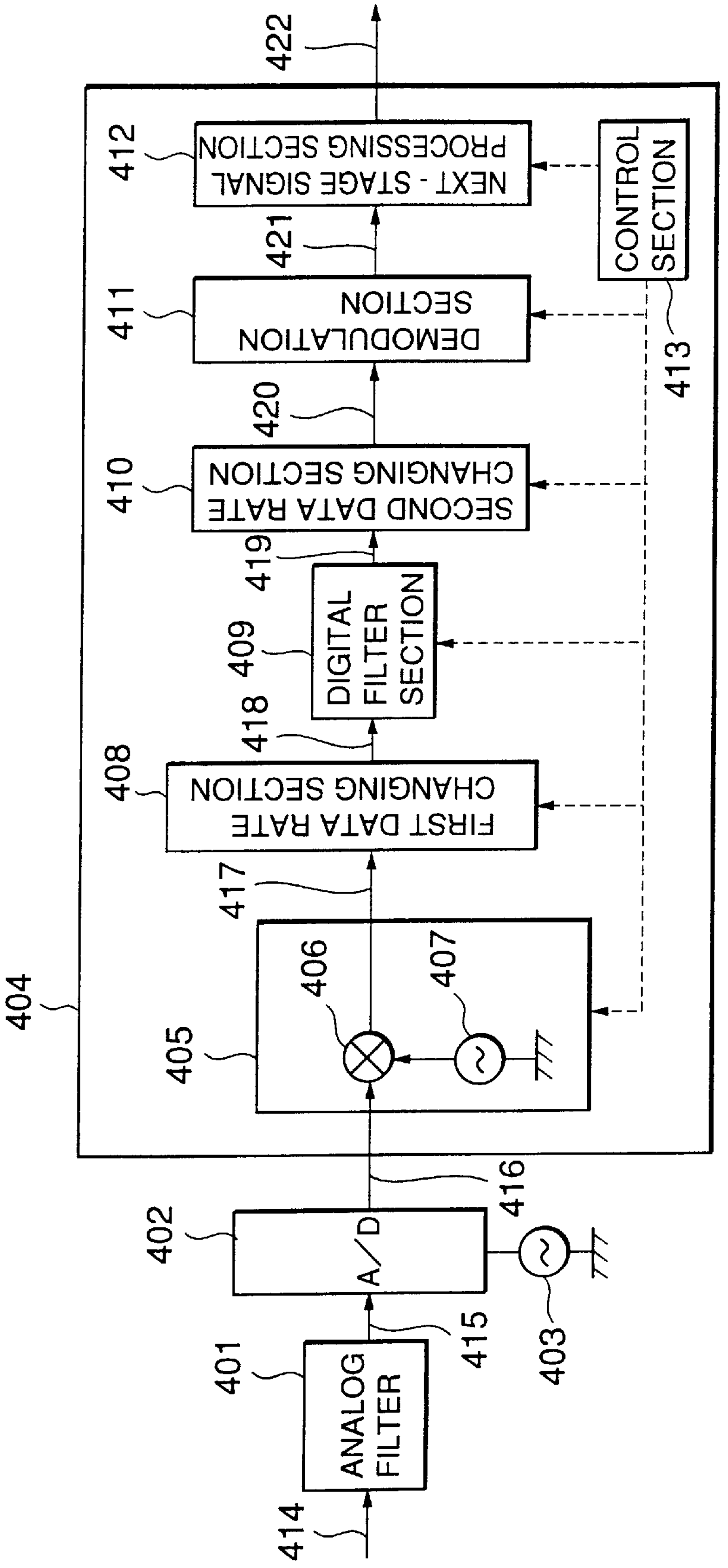
FIG. 4 is a schematic block diagram showing the main part of a radio receiver according to another embodiment of the present invention.

FIG. 4 is a schematic block diagram showing the main part of a radio receiver according to the second embodiment of the present invention.

Referring to FIG. 4, the radio receiver of the second embodiment includes an analog filter 401 for band-limiting an input signal, an A/D converter 402 for sampling an input signal and converting it into a digital signal, an oscillator 403 for supplying a sampling clock to the A/D converter 402, and a signal processing section 404.

The signal processing section 404 is comprised of a DSP or CPU, a ROM, and a RAM. This section may be implemented by software or hardware by using a logic circuit such as a gate array or FPGA.

The signal processing section 404 is comprised of a down conversion section 405 for down-converting digital data 416 received from the A/D converter 402, a first data rate changing section 408 for changing the data rate of a signal having undergone down-conversion, a digital filter section 409 for extracting a channel to be received, a second data rate changing section 410, a demodulation section 411, a next-stage signal processing section 412 for performing conventional signal processing such as decoding, and a control section 413.

The down conversion section 405 is comprised of a mixer 406 and a digital oscillator 407.

FIGS. 5A to 5D are timing charts for explaining a variable sampling frequency decreasing method in the second embodiment of the present invention in FIG. 4.

The operation of the second embodiment will be described with reference to FIG. 4 and FIGS. 5A to 5D.

Assume that in a radio receiver capable of receiving several different channel frequencies in a receivable band B, a given channel frequency fIFn (n is an arbitrary number) is to be received. The arrangement of part of the reception section in operation to be performed in this case will be described below with reference to FIG. 4.

An analog input signal 414 is band-limited by the analog filter 401. This analog filter 401 is a filter that passes the receivable band B.

A band-limited signal 415 is sampled and quantized by the A/D converter 402 with a sampling clock generated by the oscillator 403 and having a sampling frequency fs. According to the Nyquist theorem, this sampling frequency fs needs to be two times or more the receivable band B. In this case, the data rate of a signal 416 is the sampling frequency fs.

The signal processing section 404 is constituted by a DSP or CPU, a ROM, and a RAM when it has a software configuration. When this section is to have a logic configuration, the same function is implemented by a gate array, FPGA, or the like.

The signal 416 (data rate fs) sampled by the A/D converter 402 is input to the signal processing section 404.

First of all, the control section 413 controls the down conversion section 405 constituted by the mixer 406 and the digital oscillator 407 to down-convert the received channel frequency fIFn. More specifically, the control section 413 controls the digital oscillator 407 to set the frequency to fIFn−fIF0 or fIFn+fIF0. In this case, the frequency fIF0 is a frequency required for demodulation in the demodulation section 411.

As a result, a signal 417 having undergone down-conversion becomes fIF0. This signal 417 is input to 25 the first data rate changing section 408. The control section 413 changes the data rate on the basis of the information of the received frequency fIFn. As a consequence, the data rate of an output signal 418 is set to fsbn (n is an arbitrary number).

A signal 419 having passed through the digital filter section 409 serving as a channel filter is input to the second data rate changing section 410. The control section 413 controls the second data rate changing section 410 to make an output signal 420 from the second data rate changing section 410 have a data rate of fsb0. In this case, the data rate fsb0 must satisfy a Nyquist condition with respect to the frequency fIF0 and a pass band B0 required for reception. In this case, the condition is fsb0≧2×(fIF0+B0/2).

The signal 420 is input to the demodulation section 411 to be demodulated. A demodulated signal 421 is transferred to the next-stage signal processing section 412. The next-stage signal processing section 412 is an existing signal processing unit and has constituent elements for control by signal formats, decoding, speech reproduction, and the like. The next-stage signal processing section 412 outputs sound, light, speech, FAX data, LCD data, PC data, and the like.

Data rate change operation in the second data rate changing section 410 may be performed in the digital filter section 409.

A variable sampling frequency decreasing method in the second embodiment shown in FIG. 4 will be described with reference to FIGS. 5A to 5D.

Figure 5A:
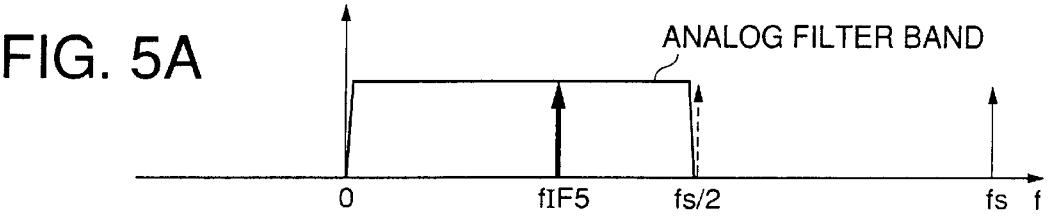
FIGS. 5A to 5D are timing charts for explaining a variable sampling frequency decreasing method in the embodiment shown in FIG. 4.

FIG. 5A shows an analog filter band including the receivable band B, the sampling frequency fs in A/D conversion which is two times or more the receivable band B according to the Nyquist theorem, and a channel frequency fIF5 to be received.

Figure 5B:
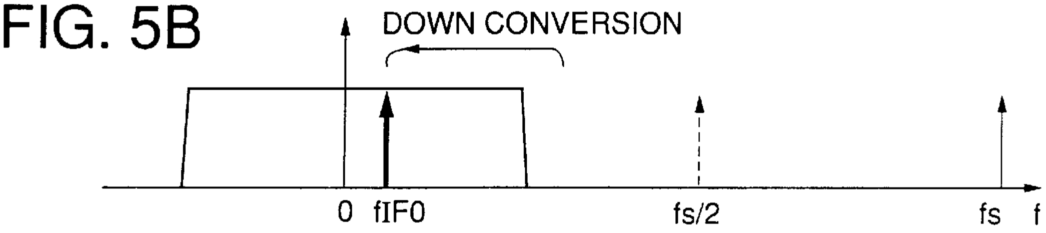

FIG. 5B shows the signal 417 obtained when the frequency is decreased to a frequency fIF0 required to demodulate the reception channel frequency fIF5 in the down conversion section 405.

Figure 5C:
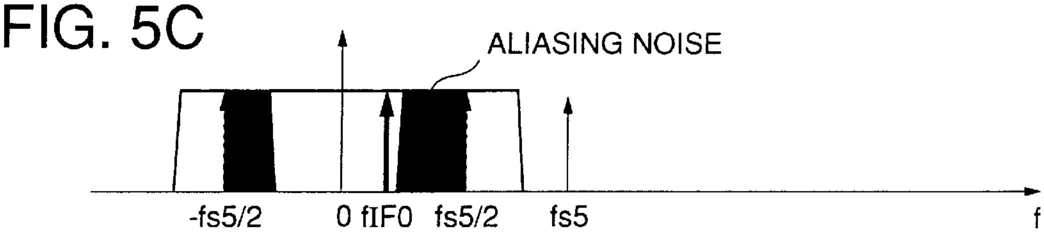

FIG. 5C shows the signal 418 obtained when the data rate is changed to fs5 by the first data rate changing section 408. Referring to FIG. 5C, the data rate fs5 must be set to prevent aliasing noise from entering the pass band B0 required for reception.

Figure 5D:
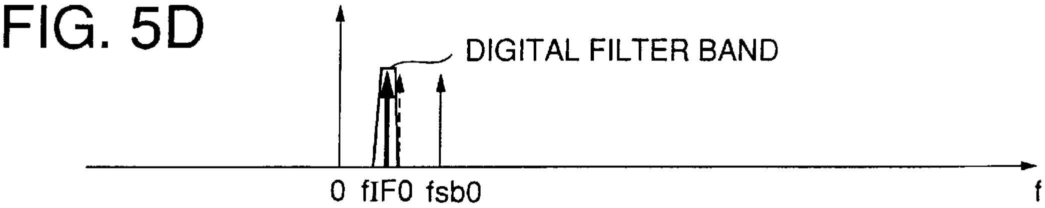

FIG. 5D shows a case in which the required pass band B0 is extracted by the digital filter section 409, and the data rate is changed to fsb0 by the second data rate changing section 410.

Since the signal has already been band-limited by the digital filter section 409, and the frequency fsb0 satisfies fsb0≧2×(fIF0+B0/2), even if the sampling rate is decreased to fsb0, aliasing noise exerts no influence on the signal. This signal is the signal 420 and supplied to the demodulation section 411.

Since the present invention is based on a device including a plurality of channel frequencies, it most likely uses FDMA. In practice, however, channels for CDMA or TDMA can be included in the simultaneous receivable band.

What is claimed is:

1. A radio receiver comprising:

a data rate changing section which receives data having a first data rate and outputs data having a decreased second data rate;

a quadrature demodulator which performs quadrature demodulation on the data having the second data rate; and a signal processing section which performs signal processing on the quadrature-demodulated reception data having the second data rate, thereby reducing power consumption by the radio receiver.

2. A radio receiver capable of receiving a plurality of different channel frequencies, comprising:

an A/D converter for receiving a signal having a first frequency and converting the received signal into a digital signal;

sampling frequency changing means for decreasing a frequency at which said A/D converter samples the received signal in accordance with the first frequency of the received signal;

a quadrature demodulation section for receiving the digital signal having the decreased sampling frequency and for outputting a quadrature-demodulated digital signal having the decreased sampling frequency; and a signal processing section for performing digital signal processing on the quadrature-demodulated digital signal having the decreased sampling frequency so as to reduce power consumption by the radio receiver.

3. A radio receiver capable of receiving a plurality of different channel frequencies, comprising:

an A/D converter for converting a reception signal into a digital signal;

a signal processing section for performing digital signal processing on the digital signal;

a quadrature demodulation section for receiving the digital signal input to said signal processing section and outputting a quadrature-demodulated digital signal; and a data rate changing section which receives the quadrature-demodulated digital signal having a first data rate, and generates and outputs a quadrature-demodulated digital signal having a decreased second data rate so as to reduce power consumption by the radio receiver.

4. A receiver according to claim 3, wherein the data rate is changed by said data rate changing section twice after quadrature demodulation.

5. A receiver according to claim 3, wherein said data rate changing section comprises a first data rate changing section and a second data rate changing section.

6. A receiver according to claim 5, wherein a digital filter for extracting a desired reception channel also serves as said second data rate changing section.

7. A power consumption reducing method in a radio receiver, comprising the steps of:

receiving digital data having a first data rate;

performing quadrature demodulation of on the received data having the first data rate;

modifying the received quadrature demodulated digital data having the first data rate so as to change the first data rate to a second decreased data rate; and performing signal processing on the quadrature-demodulated digital data having the decreased second data rate, thereby reducing power consumption by the radio receiver.

8. A method according to claim 7, wherein the data rate of said quadrature-demodulated reception data is decreased twice.

9. A radio receiver capable of receiving a plurality of different channel frequencies, comprising:

an A/D converter which converts a received signal into a digital signal;

a quadrature demodulation section for receiving the digital signal and outputting a quadrature-demodulated digital signal;

a signal processing section which performs digital signal processing on the quadrature-demodulated digital signal; and a sampling frequency changing section which decreases a sampling frequency in said A/D converter in accordance with a frequency of the received signal, so that the radio receiver consumes less power for signal processing of the received signal.

10. A radio receiver comprising a first device which receives data having a first data rate, the first device initially modifying the received data to lower the first data rate of the received data to a decreased second data rate, a second device which receives the data having the second data rate and outputs quadrature-demodulated data having the second data rate, a third device which receives the quadrature-demodulated data having the second data rate and outputs quadrature-demodulated data having a third data rate which is decreased with respect to the second data rate, a fourth device which receives the quadrature-demodulated data having the third data rate and outputs quadrature-demodulated data having a fourth data rate which is decreased with respect to the third data rate, and a fifth device which performs signal processing on the quadrature-demodulated data having the fourth data rate.

11. A radio receiver capable of receiving a plurality of different channel frequencies, comprising:

an A/D converter for converting a received signal into a digital signal having a first data rate;

a quadrature demodulation section for receiving the digital signal having the first data rate and outputting a quadrature-demodulated digital signal having the first data rate;

a data rate changing section which receives the quadrature-demodulated digital signal having the first data rate, the data rate changing system generating and outputting a first quadrature-demodulated digital signal having a decreased second data rate, and subsequently generating and outputting a second quadrature-modulated digital signal having a third data rate decreased with respect to the second data rate; and a signal processing section for performing digital signal processing on the digital signal having the first data rate.

12. A power consumption reducing method in a radio receiver, comprising the steps of receiving reception data having a first data rate, generating and outputting reception data having a decreased second data rate which is lower than the first data rate, performing quadrature demodulation on the reception data having the second data rate and outputting quadrature-demodulated reception data having the second data rate, generating and outputting quadrature-demodulated reception data having a decreased third data rate, which is lower than the second data rate, generating and outputting quadrature-demodulated reception data having a decreased fourth data rate, which is lower than the third data rate, and performing signal processing on the quadrature-demodulated reception data having the fourth data rate.

13. A radio receiver capable of receiving a plurality of different channel frequencies, comprising:

an A/D converter which converts a received signal into a digital signal;

a signal processing section which performs digital signal processing on the digital signal, said signal processing section comprising a data rate changing section which decreases a data rate of said digital signal at least twice after quadrature demodulation in accordance with a frequency of the reception signal.

14. A radio receiver, which receives reception data at a first data rate, comprising:

at least one data rate changing section receiving data having a first data rate and outputting digital data having a second decreased data rate that is lower than the first data rate, in accordance with a channel frequency of the reception data;

a quadrature demodulation section for performing quadrature modulation on the digital data having the second data rate; and a signal processing section receiving the quadrature-demodulated digital data to process it at the second data rate, thereby reducing the amount of power consumption by the radio receiver.

15. A radio receiver, which receives a plurality of different channel frequencies, comprising:

an A/D converter for converting a received signal to a digital signal at a first sampling frequency rate;

a quadrature demodulator for receiving the digital signal having the first sampling rate and outputting a quadrature-demodulated digital signal having the first sampling rate;

a sampling frequency changing section for receiving the quadrature-demodulated digital signal having the first sampling rate and for generating and outputting a quadrature-demodulated digital reception signal having a second sampling frequency rate lower than the first sampling frequency rate; and a signal processing section for receiving the quadrature-demodulated digital signal and processing it at the second sampling frequency rate, thereby reducing the amount of power that the radio receiver must consume in order to process the reception signal.

16. A method for reducing power consumption by a radio receiver, comprising the steps of:

receiving and quantizing data having a first data rate;

generating and outputting modified digital reception data having a decreased second data rate;

performing quadrature demodulation on the modified digital reception data having the decreased second data rate;

signal processing the quadrature-demodulated modified digital reception data having the decreased second data rate, thereby reducing power consumption of the radio.

17. A radio receiver capable of receiving a plurality of different channel frequencies, the radio receiver comprising:

an A/D converter section which receives an input signal having a first frequency, samples the input signal, and converts the input signal into a digital signal having a second frequency lower than the first frequency;

a sampling frequency changing section coupled to the A/D converter section and effective to decrease a sampling frequency at which the A/D converter samples the input signal;

a quadrature demodulation section which receives the digital signal having the second frequency and outputs a quadrature-demodulated digital signal having the second frequency; and a data rate changing section which receives the quadrature-demodulated digital signal and generates another digital signal having a third frequency lower than the second frequency.

18. A radio receiver capable of receiving a plurality of different channel frequencies, comprising:

an A/D converter for receiving a signal having a first frequency and converting the received signal into a digital signal having a decreased sampling frequency;

a first data rate changing section which receives a quadrature-demodulated digital signal having the decreased sampling frequency, and outputs a quadrature-demodulated digital signal having a first decreased data rate;

a second data rate changing section which receives the quadrature-demodulated digital signal having the first decreased data rate, and generates and outputs a quadrature-demodulated digital signal having a second decreased data rate; and a signal processing section for performing digital signal processing on the quadrature-demodulated digital signal having the second decreased data rate so as to reduce power consumption by the radio receiver.

* * * * *